United States Patent
Spragg et al.

[11] Patent Number: 5,879,484
[45] Date of Patent: Mar. 9, 1999

[54] RUN FLAT BANDED PNEUMATIC TIRE

[75] Inventors: Charles D. Spragg, Hudson, Ohio; Edward G. Markow, Jensen Beach, Fla.; Thomas W. Bell, Mogadore, Ohio

[73] Assignee: Bridgestone/Firestone, Inc., Akron, Ohio

[21] Appl. No.: 782,364

[22] Filed: Jan. 13, 1997

[51] Int. Cl.⁶ .......................... B29D 30/06; B29D 30/70; B60C 9/18; B60C 17/00

[52] U.S. Cl. .......................... 152/516; 152/526; 152/527; 152/530; 152/533; 152/538; 156/85; 156/117; 156/177

[58] Field of Search ...................... 152/516, 520, 152/533, 526, 538, 530, 527; 156/117, 177, 85

[56] References Cited

U.S. PATENT DOCUMENTS

| | | |
|---|---|---|
| 4,111,249 | 9/1978 | Markow . |
| 4,287,924 | 9/1981 | Deck et al. . |
| 4,318,434 | 3/1982 | Markow . |
| 4,428,411 | 1/1984 | Markow et al. . |
| 4,456,048 | 6/1984 | Markow et al. . |
| 4,459,167 | 7/1984 | Markow et al. . |
| 4,673,014 | 6/1987 | Markow . |
| 4,734,144 | 3/1988 | Markow . |
| 4,794,966 | 1/1989 | Markow . |
| 5,201,971 | 4/1993 | Gifford ................................. 152/526 X |
| 5,368,082 | 11/1994 | Oare et al. . |
| 5,427,166 | 6/1995 | Willard, Jr. . |

FOREIGN PATENT DOCUMENTS 63-141809  12/1986  Japan .

*Primary Examiner*—Adrienne Johnstone
*Attorney, Agent, or Firm*—Daniel N. Hall

[57] ABSTRACT

A run flat pneumatic tire is reinforced by a thin annular composite band imbedded in the crown portion of the tire in combination with a plurality of radial cords or plies in its sidewalls which have freedom in shear with respect to one another. The band is formed by a plurality of layers of material strips wherein each strip is wound in a helical pattern, with adjacent strips being wound at reverse angles to each other. Each layer is formed under sufficient pressure and at an elevated temperature whereby the band is prestressed in tension which decreases the maximum stress at the footprint area of the tire. The invention furthermore incorporates the method of imparting the prestress on the annular band during its manufacture.

25 Claims, 10 Drawing Sheets

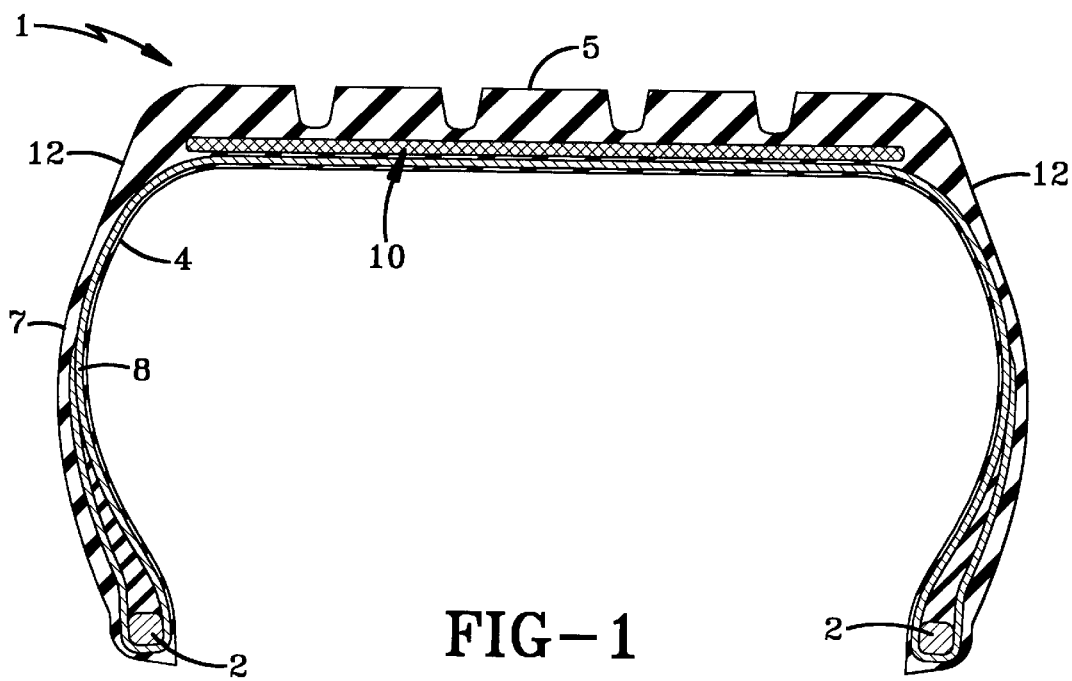
FIG-1
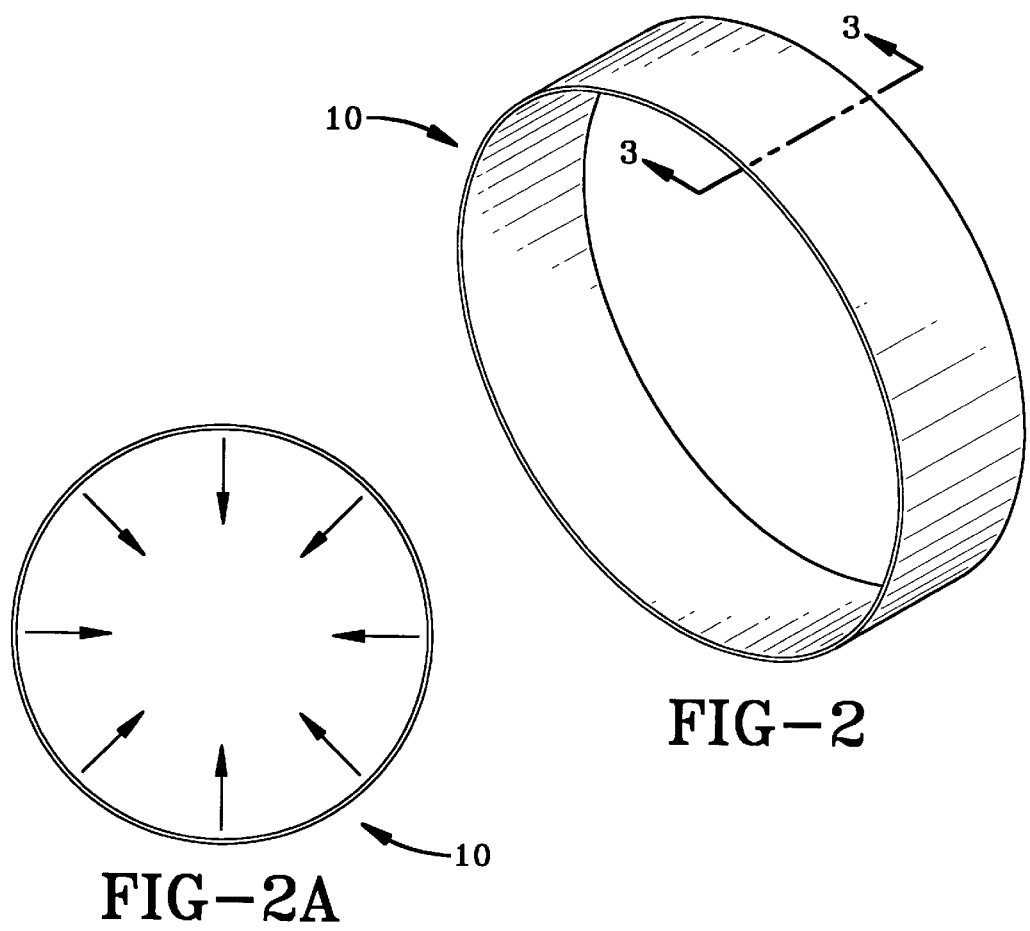
FIG-2
FIG-2A

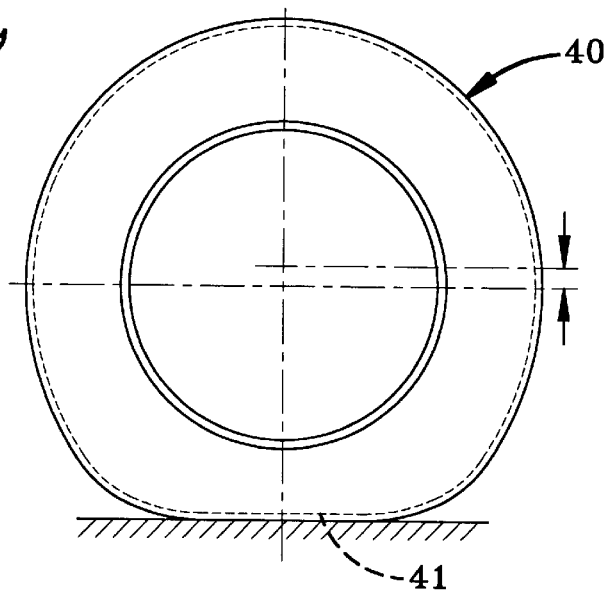
FIG-7
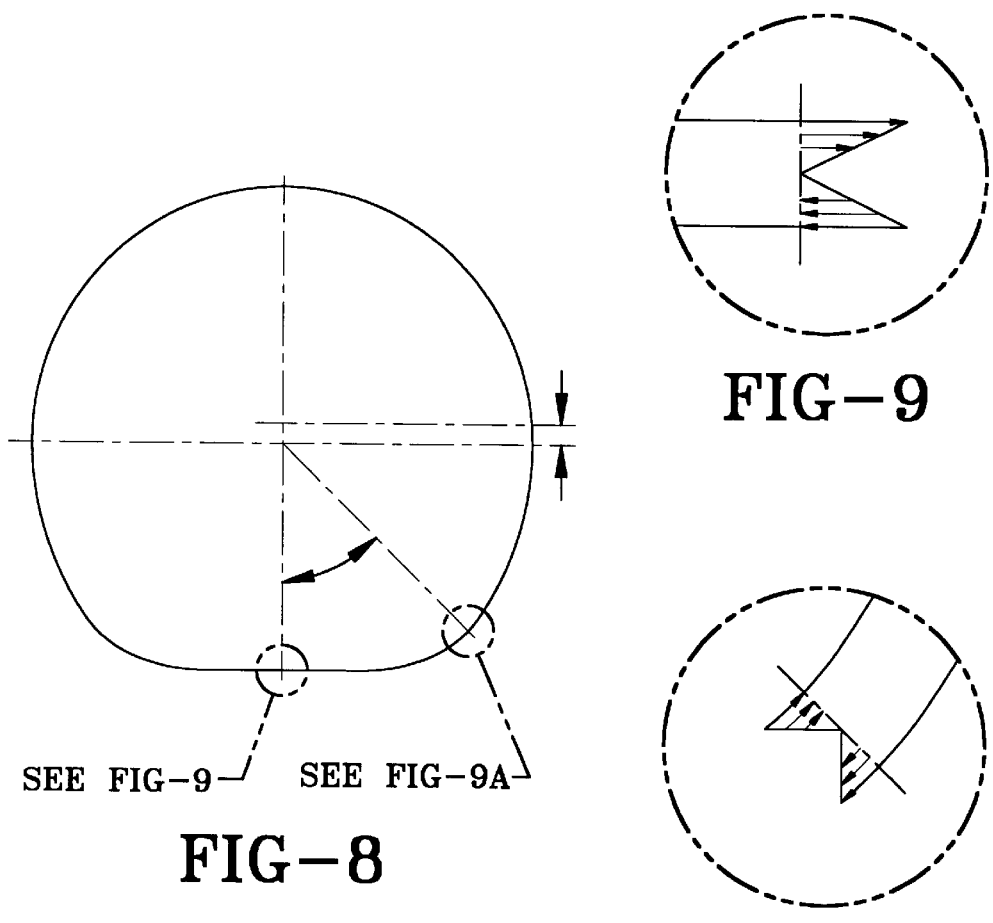
FIG-8
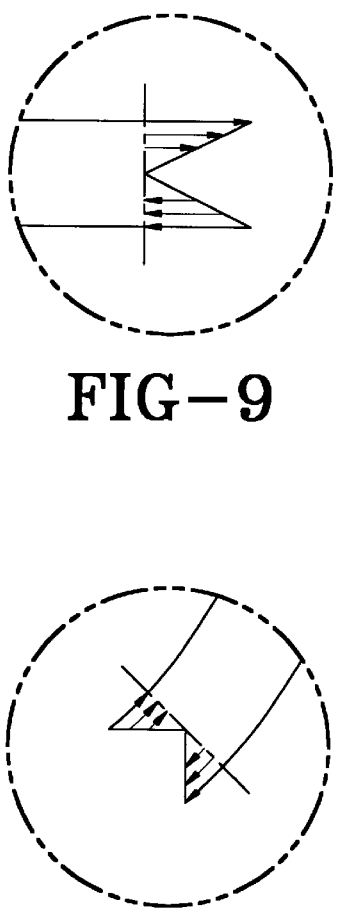
FIG-9
FIG-9A

RUN FLAT BANDED PNEUMATIC TIRE

BACKGROUND OF THE INVENTION

1. Technical Field

The invention relates to reinforced resilient pneumatic tires and more particularly to a vehicle tire reinforced by a thin annular composite band which is stabilized by a plurality of radial elements in the tire sidewalls to enable the tire to run in an unpressurized condition. More particularly, the invention relates to a pneumatic tire in which the band element is formed by a plurality of helically wound layers of material strips, in which at least the outer strips are prestressed in tension to improve the endurance of the band and minimize band stresses placed thereon during both pressurized and unpressurized conditions.

2. Background Information

Various tire constructions have been devised over the years which enable a tire to run in an under-inflated or non-inflated condition such as after receiving a puncture and loss of pressurized air for extended periods of time and at relatively high speeds. This enables the vehicle operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the side walls of the tire which enable the tire to support the vehicle weight even with the complete loss of internal air pressure. Examples of such prior art run flat tire constructions which use such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164; and 4,929,684.

In addition to these prior art run flat tire patents, various run flat tire constructions have been developed which utilize a thin annular band which extends circumferentially throughout the tire beneath the tread area. Examples of such banded run flat tires are shown in the following patents.

U.S. Pat. No. 4,428,411 describes a method to make a particular band for use in a run flat tire which uses a series of side-by-side elements in the form a helix. The band has hoop compression as against a conventional breaker belt that has no significant compressive strength but is used only to resist tension loads endured by the tire when pressurized. However, the band has no residual stresses after manufacture which reduces the critical operational stresses after integration into a tire as is the band of the present invention.

U.S. Pat. Nos. 4,673,014 and 4,794,966 teach a method to acquire desirable prestressing in a fabricated band made of helical elements. Physically bending the larger diameter helix element around a smaller mandrel and securing it with a resin impregnated tape does acquire a desirable level of prestressing. However, the band of the present invention is achieved by inherent thermal shrinkage as the sequentially overlapped material layers eliminate any physical bending of a structural element as is required in the method of these two patents.

U.S. Pat. No. 4,456,048 teaches a method of acquiring a change in band stiffness as a function of deflection. The band has a lower stiffness for normal pressurized operation and has a higher stiffness to support load when the tire is uninflated and experiences larger deflection. The band of the present invention does not have a variable stiffness but is prestressed and does not change the band stiffness. The band does favorably affect the range of operating stresses. Japanese Patent application No. JP 63141809 discloses a run flat tire having a banded element which is formed of layered strips of materials, such as an aramide filament which is impregnated with a high elasticity epoxy resin, which after hardening provides a stiffened band but provides no suggestion for prestressing a band in tension which is achieved during the manufacture of the band of the present invention. Thus the tire of this disclosure requires that elastomeric side wall inserts be utilized in combination with the band in order to achieve the desired run flat characteristics.

Other run flat banded pneumatic tires are shown in U.S. Pat. Nos. 4,111,249; 4,318,434; 4,428,411; 4,459,167; and 4,734,144.

Banded tires have been fabricated with band materials made of steel, aluminum, titanium, and epoxy and thermoplastic composites with glass, KEVLAR (aromatic polyamide) and graphite fiber reinforcement. The common failure mode with the light, economical laminate band construction is interlaminar shear within the band's primary bending neutral axis. This is a fatigue failure and is directly related to the spectrum of cyclic operating stress. As in all fatigue failures, the lower the stress, the longer the operating life.

Prestressing techniques lower the critical operating stress. This critical operating stress occurs in the footprint of the tire and is induced by road surface irregularities, aggravated by ride dynamics. This feature was identified by operating loaded tires on dynometer wheels and then compared with actual road tests. Dynometer tests showed an increase in cyclic life by a factor of 10–20 times. Thus, anomalies in the road surface can greatly shorten tire life when compared to dynometer testing.

There are three recognized approaches to improve the interlaminar fatigue life of the bands: lower the critical operating stress, improve the toughness features of the matrix and the introduction of reinforcing fibers thru the failure plane. This latter approach uses a weaving process and is applicable to wet or preimpregnated fiber tows or thermoplastic tape.

The proposed approach of the present invention uses a prestressing technique to reduce the critical operating stresses. The unique feature identified in this approach is that of beneficial residual stresses are introduced in the band by the fabrication process. The sequential application of reinforced thermoplastic tapes employing heat and high pressure to the contacting surfaces results in a gradual buildup of residual stress. The geometric features of the invention retain the desired strength of the reinforcing fiber in the hoop direction and provide adequate lateral strength, with the level of beneficial residual stress being achieved in the preferred embodiment with a winding angle preferably of ±15°–20° off circumferential.

SUMMARY OF THE INVENTION

Objectives of the invention include providing an improved run flat pneumatic tire that is substantially similar in ride, comfort, durability and operation as conventional pneumatic tires, yet which is able to be operated safely at reasonable speeds and for a sufficient number of miles after loss of internal pressurization.

Another objective of the invention is to provide such a pneumatic tire having a radially stabilized annular reinforcing element, band or compressive element, in combination with a plurality of closely spaced substantially radial reinforcing elements formed in the side wall of the tire, which radial elements have freedom in shear with respect to one another, to provide the internal support for the pneumatic tire after loss of pressurization without the need of crescent-shaped side wall elastomeric reinforcing elements heretofore used in most run flat tire constructions which add undesirable weight, increased rolling resistance and cost to the tire.

Another objective of the invention is providing such a run flat tire which has enhanced load carrying capability, improved endurance of the annular band molded within the crown portion of the tire, and which minimizes band stress by the band being in a prestressed state as a result of it's particular method of manufacture.

Still another objective of the invention is to provide such a run flat tire in which the annular band acts as a structural compression member when in the tire in the unpressurized state, and which allows tension loads within the side wall reinforcing to be distributed over a substantial portion of the circumference of the tire, and in which the state of stress is manufactured into the annular band by appropriately pre-stressing band fibers on the outside diameter of the band into tension by forming the band under pressure and at an elevated temperature, whereupon thermal shrinkage of the particular material from which the band layers are formed imparts the tension to the band.

Still another objective of the invention is to provide such a run flat tire which provides reduction of the maximum stresses occurring in the outer fibers of the band when in a deflected condition at the center of the footprint, and which improves band element fatigue life and endurance.

Another objective of the invention is to provide such a run flat tire in which the annular band is a relatively thin composite band fabricated of material such as steel, aluminum, thermoplastic and thermosetting materials, and of other similar multiple layer composites.

A further objective of the invention is to provide such a run flat tire in which the annular band element is formed by a plurality of overlapping layers, each of which is formed of a material strip wound in a helical configuration, with the adjacent strips preferably being in an overlapping reverse angular relationship to each other.

A still another objective of the invention is to provide such a run flat tire which is substantially puncture resistant from tread-contacting road hazards, which can be manufactured at a cost and weight competitive with conventional non-run flat tire constructions, and which will permit the elimination of a spare wheel and tire conventionally required in automobiles, thereby providing a cost saving to vehicle manufacturers and owners.

These objectives and advantages are obtained by the improved run flat tire of the invention, the general nature which may be stated as including a pneumatic tire having an elastomeric casing with a tread formed in a crown portion thereof and sidewalls extending from the crown portion to generally circular beads adapted to normally seat themselves in an airtight secured relationship with a wheel, a combined structure for resisting compressive forces on the tire when deflated, the structure comprising a continuous thin annular composite band fixed in said tire radially inwardly of said tread, said band having a width substantially spanning the width of the crown portion and including a plurality of helically wound adjacently positioned flat strips of material forming a plurality of wound layers of said material strips with at least a portion of the strips located in outermost layers of said composite band being prestressed in tension to decrease the maximum stress at a footprint area of the tire; and means to radially stabilize the annular band comprising a multiplicity of closely spaced substantially radial reinforcing elements having freedom in shear with respect to one another in the sidewalls operatively connected to the beads and extending therefrom to at least the crown position of the tire and being operatively connected to the annular band.

These objectives and advantages are further obtained by the improved method for building a run flat pneumatic tire of the type having a casing with a tread and a crown portion and sidewalls containing a plurality of closely spaced radial stabilizing elements extending from the crown portion to a bead area wherein the method includes the steps of forming a thin annular composite band by wrapping a plurality of strips of material in overlapping alternating helical configurations around a mandrel to form the band with a plurality of strip layers, maintaining the strips at an elevated temperature sufficient to provide a tacky consistency to said strips as said strips are being wrapped around the mandrel, applying sufficient tension to the strips as they are being wrapped around the mandrel to substantially eliminate voids between the overlapping strip layers, and cooling the strip layers after being applied under tension around the mandrel whereby thermal shrinkage of the strips prestresses the formed band in tension; embedding the prestressed band inside the crown portion of the tire; and curing the resulting tire wherein the prestressed band in cooperation with the radial stabilizing elements in the sidewalls resist compressive forces encountered upon deflation of the tire.

BRIEF DESCRIPTION OF THE DRAWINGS

A preferred embodiment of the invention, illustrative of the best mode in which applicants have contemplated applying the principle, is set forth in the following description and is shown in the drawings and is particularly and distinctly pointed out and set forth in the appended claims.

FIG. 1 is a sectional view through a pneumatic tire having the improved reinforcement band incorporated therein;

FIG. 2 is a reduced perspective view of the reinforcement band removed from the tire of FIG. 1;

FIG. 2A is a diagrammatic side elevation of the band of FIG. 2 showing the prestressed force arrows;

FIG. 7 is a diagrammatic side elevational view of the improved pneumatic tire of FIG. 1 incorporating the reinforcement band therein, shown in a deflected uninflated state;

FIG. 8 is a diagrammatic view showing the reinforcement band geometry changing from circular to flat against the road surface when in both the pressurized and run flat (unpressurzed) condition;

FIGS. 9 and 9A are diagrammatic views taken off FIG. 8 showing the relative state of stress of the band when in an uninflated deflected condition, with FIG. 9 showing the band element outer fibers in compression and FIG. 9A showing the band element outer fibers in tension;

Similar numerals refer to similar parts throughout the drawings.

DESCRIPTION OF THE PREFERRED EMBODIMENT

Figure 3:
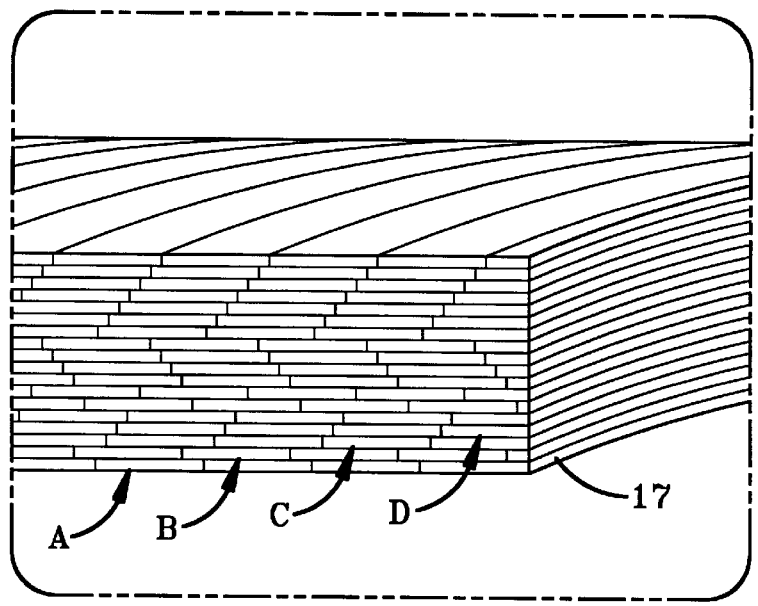
FIG. 3 is a greatly enlarged fragmentary sectional view taken on line 3—3, FIG. 2.

The improved pneumatic tire of the present invention is indicated generally at 1, and is shown in cross section FIG. 1. Most of the components of tire 1 are of a conventional design and consist of a pair of beads 2 which are adapted to be sealed in an airtight relationship on a wheel. Tire 1 further comprises a carcass or casing 4 having an outer peripheral tread portion 5 in a crown region, and sidewalls 7 extending on both sides from the crown portion to beads 2. Tread 5 is formed with a usual tread pattern depending upon the particular ride characteristics to be achieved by the pneumatic tire.

Side walls 7 of the casing are reinforced by usual radial reinforcing elements 8 which extend in a spaced parallel relationship throughout the sidewalls and are turned up about beads 2 and have freedom in shear with respect to one another. As is well known in the art, sidewall plies are reinforcement fibers composed of rayon, nylon, polyester, steel and other types of known materials. These side wall reinforcements extend from at least the crown portion of the tire and throughout the sidewalls to the bead area thereof.

In accordance with one of the main features of the invention an improved annular stiffening band indicated generally at 10, is mounted within the crown portion of the tire radially beneath the tread, and extends circumferentially throughout the tire. Band 10 is operatively connected to the side wall reinforcing elements 8, either physically or through the intervening elastomeric material of the crown portion, which bonds the band to the reinforcing elements and radially stabilize the band. Band 10 is relatively thin in contrast to its width, and can range in width between 6 and 12 inches and in thickness substantially between 0.1 and 0.2 inches depending upon the particular tire in which it is bonded. In the preferred embodiment band 10 has a width of approximately 6.7 inches and thickness of approximately 0.120 inches. As shown in FIG. 1, band 10 has a width substantially equal to and extends throughout the width of tread 5, preferably terminating approximately 0.50 inches short of the outside surface of tire shoulders 12. It is also understood that tire 1 will include a usual innerliner, gum abrasive strips and other components present in a usual pneumatic tire, which are not shown in FIG. 1 or discussed in further detail.

As discussed above, the object of the invention is the formation of band 10 so as to have an enhanced load carrying capability with improved endurance, and which minimizes band stress, achieved by providing a state of prestress in the band as a result of its manufacture. This is achieved by prestressing, in particular the band fibers or material strips in the outside diameter of the band, into tension as described herein below.

FIG. 3 discloses a very enlarged exaggerated cross-sectional view of a portion of the composite band shown in FIG. 2, in which the band is formed of 18 individual layers which are in an overlapping stacked relationship, which each of the layers being formed by a relatively thin flat strip of material, which strips are wound in a helical configuration, with adjacent strips preferably extending in an opposite angular relationship to each other as discussed further below.

Figure 4:
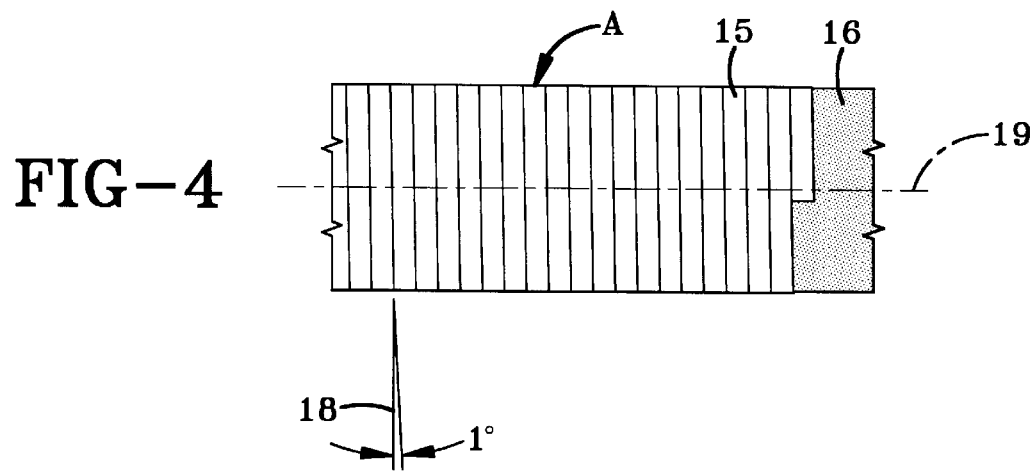
FIG. 4 is a diagrammatic fragmentary view showing the initial layer of the band forming strips being wound about a mandrel for forming the band of FIGS. 1–3.
Figure 5:
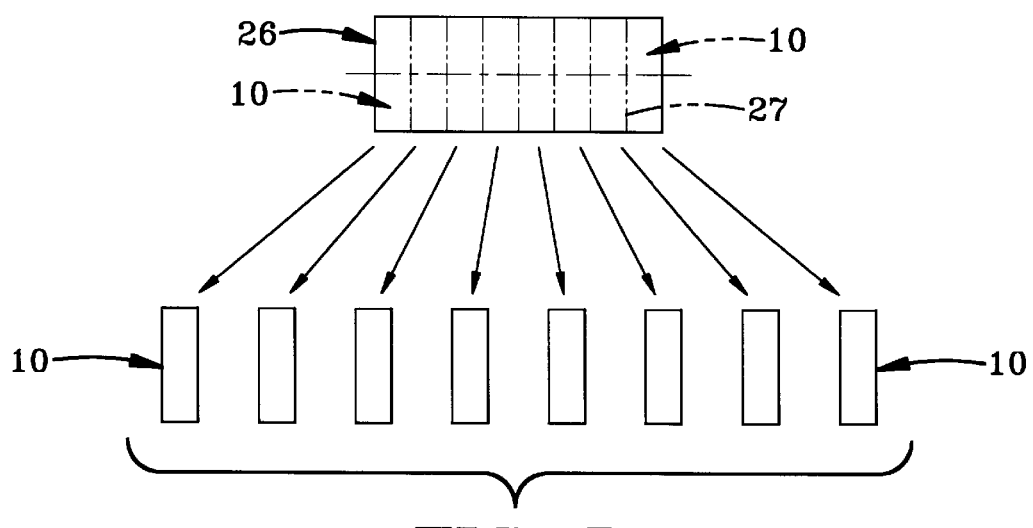
FIG. 5 is a reduced diagrammatic view showing the formation of a plurality of the bands of FIG. 2 by severing portions from the multi-layer band produced as shown in FIGS. 4–4D.

The preferred method for forming band 10 is shown diagrammatically in FIGS. 4 through 5. A relatively flat strip of material indicated at 15, is wound in a side-by-side abutting relationship about a cylindrical forming mandrel 16. Each strip is formed preferably of many fibers imbedded in a suitable resin or matrix. For example strip 15 may be formed of a graphite fiber coated with a thermoplastic resin. However, other types of materials can be utilized with equal success, such as fiberglass, Kevlar and even thin metallic materials such as aluminum or steel.

Figure 4A:
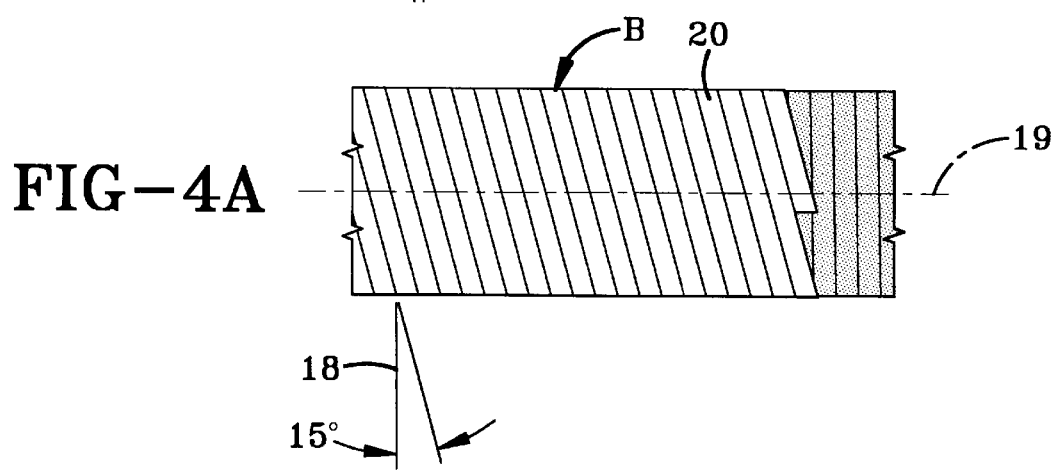
FIGS. 4A, 4B, 4C and 4D are diagrammatic views similar to FIG. 4 showing the winding of successive layers of the band forming strips on the mandrel, as shown in FIG. 4.

The first or innermost strip 17 of band 10, is wound in an abutting side-by-side relationship in a helical configuration on mandrel 16 at a very slight angle, for example approximate 1°, with respect to a imaginary radial line 18 which is perpendicular to the central axis 19 of mandrel 16, and subsequently of formed band 10. Strip 17 when wound about the mandrel forms an innermost or first layer indicated at A. A second layer B is formed by a second strip of material 20 which is also wound about mandrel 16 in an abutting side-by-side relationship, on top of strip 17 but at a much greater angle, for example 15°, with respect to radial line 18 as shown in FIG. 4A.

Figure 4B:
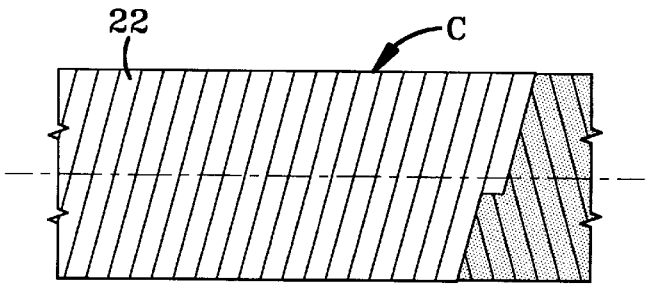
Figure 4C:
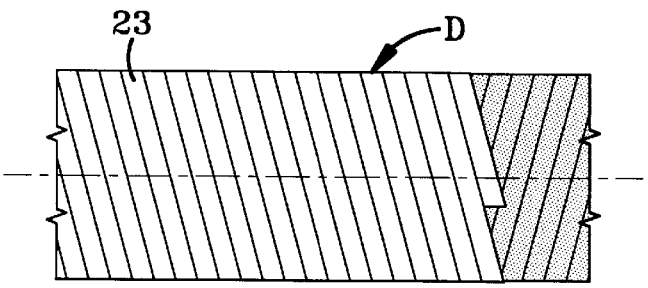
Figure 4D:
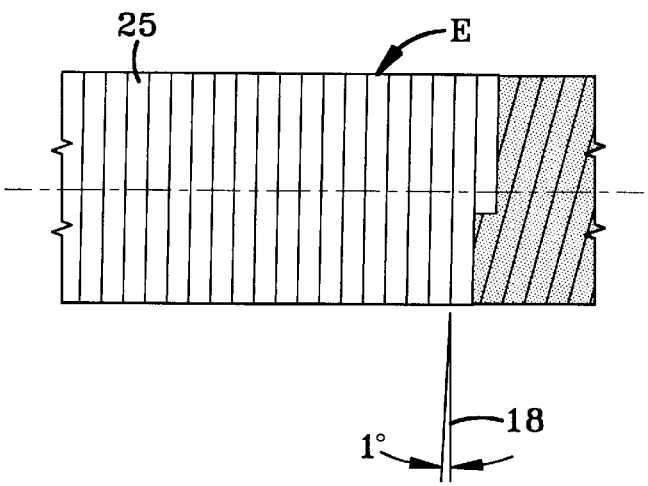

As shown in FIGS. 4B, 4C and 4D, intermediate strips 22 and 23 are wound in a similar side-by-side abutting relationship in a helical configuration as are strips 17 and 20, each at angles of substantially ±15° in a crossing fashion with respect to the lower adjacent strip, forming layers C and D. In the preferred embodiment sixteen intermediate layers will be wound in a similar manner in a crossing pattern to the adjacent layer again at angles of substantially ±15°. An outermost layer E is formed by a strip 25 as shown in FIG. 4D, and preferably will be wound at an approximate 1° angle opposite to the approximate 1° angle of innermost strip 15 of FIG. 4.

In the preferred method of manufacture it is anticipated that mandrel 16 will have a length substantially greater than the width of band 10, for example 5 feet, with a resulting elongated composite cylindrical member 26 being formed by the plurality of overlapping layers discussed above. Member 26 is severed along lines 27 to form a plurality of bands 10 therefrom, for economy of production. However, this step may vary depending upon the particular manufacturing operation finally utilized for forming band 10.

As discussed above, in the preferred embodiment the band will have a width approximately 1 inch less than the tread width, and for a usual passenger tire, such as a P225/60R16 tire, will be approximately 6.7 inches wide and a thickness of substantially between 0.1 and 0.2 inches with the preferred thickness of approximately 0.12 inches, and will consist of 18 layers of the wound strips of material, with each of the layers having a thickness of 0.007 inches. The material strips will be graphite fiber with a thermoplastic resin matrix, with the layup angle of layer A being +1°, layers 2–17 being alternating ±15°, and the outermost layer 25 being –1°. The preferred width of each of the strips is 1 inch.

As another example, such as a 10.0/25.5R15 radial race tire, the band will have an 0.180 inch thickness and a width of 10.625 inches. Thus, band 10 is adaptable for use in a variety of tires such as passenger, truck, racing, etc. within the concept of the invention.

It has been found that a preferred band stiffness (per inch of band width) of approximately 2000 lb-in$^2$ is sufficient for achieving the desired run flat characteristics without requiring any side wall reinforcing elastomeric inserts as required in other prior art run flat tires. Decreasing the band stiffness below this limit still will achieve the run flat effect without the elastomeric inserts for low aspect tires for low aspect tires and may provide a smoother ride. Thus, the band stiffness will vary depending upon the particular type of tire in which it will be incorporated and the ride characteristics to be achieved.

Figure 6:
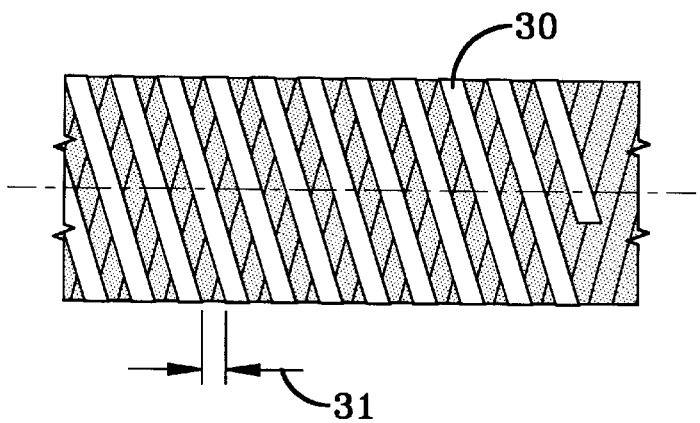
FIGS. 6, 6A, 6B and 6C are diagrammatic perspective views similar to FIGS. 4–4D showing a modified arrangement and method of winding the strips on the mandrel for forming the band.
Figure 6A:
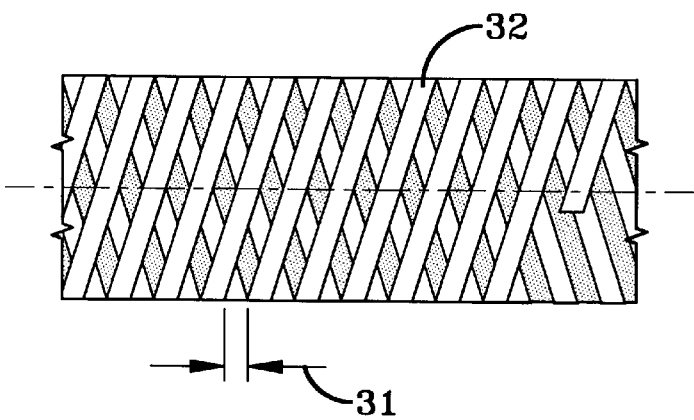
Figure 6B:
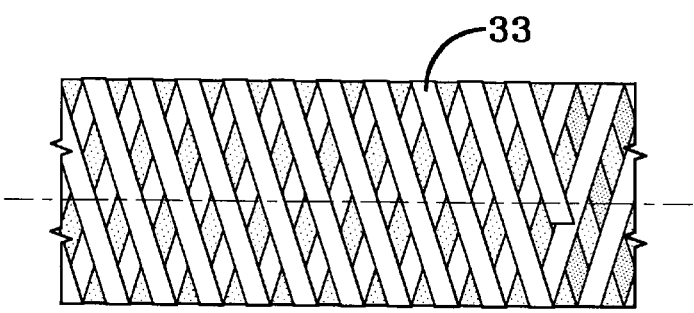
Figure 6C:
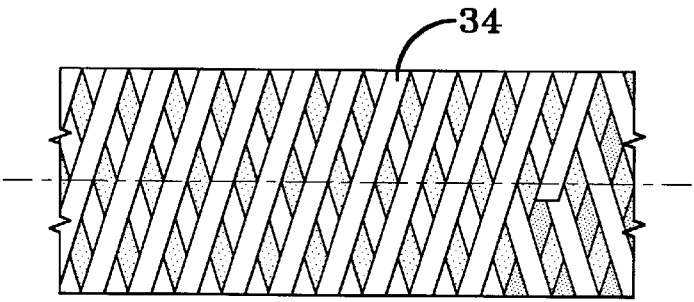

FIGS. 6–6C show a modified method of forming band 10 in which the individual strips of material are arranged in a basket weave configuration. The first several inner strips preferably are arranged in a similar manner as shown in FIGS. 4–4C, followed by the basket weaving of a plurality of intermediate strips or layers. As shown in FIG. 6 first intermediate strip 30 is wound over the previously laid helical strips, which have been placed in their abutting side-by-side relationship, with strip 30 being wound in a helical configuration at an angle, for example of 45° with respect to imaginary radial line 18. However, each of the convolutions are spaced apart at a distance 31, substantially but not less than equal to the width-of the strip. An adjacent intermediate strip 32 (FIG. 6A) is then wound in a helical configuration at an angle opposite to the angle of strip 30 of FIG. 6, again with a similar spacing 31 being provided between the individual convolutions.

Another strip 33 then is wound in a helical configuration (FIG. 6B) at the same angular relationship as strip 30 of FIG. 6, with strip 33 lying in the voids or spacings formed between strip 30. Next a strip 34 is wound over strip 33 in an equal opposite angular relationship to that of strip 33 and at the same angle as strip 32, and lies in the spacing between the individual convolutions of strip 32 forming the overlapping interwoven basket weave construction thereto. The outer layers then are laid in the abutting side-by-side relationship as are the inner layers to finalize the construction or layup of band 10.

As discussed above, the preferred layup of the individual strips is $(+0)(\pm75_8)(0)$ or $(+0)(\pm15_8)(-0)$ depending upon the axis from which the angle is measured. Other alternative layup patterns are:

$[(\pm0)(\pm15)_2(\pm0)_6(\pm15)_2(\pm0)]$ $[(\pm0)(+15)_2(\pm0)_2(-15)_2(\pm0)_2(-15)_2(\pm0)_2(+15)_2(\pm0)]$ $[(\pm0)(\pm15)_{10}(\pm0)]$ $[(\pm0)(\pm5)_{10}(\pm0)]$ $[(+0)(\pm45)_8(-0)]$ $[(+0)(\pm15)_0(-0)]$, (±15) plies interwoven $[(+0)(90)(0)(-90)(-0)(90)(0)(-90)(-0)(-0)(-90)(0)(90)(-90)(0)(90)(+0)]$ $[(0)(45)(90)(-45)(-0)(45)(90)(-45)(0)(0)(-45)(90)(45)(-0)(-45)(90)(45)(0)]$ $[(0)(90)_4(\pm15)_4(90)_4(0)]$, (±15) plies interwoven However, as discussed above, the first and last layers may be at ±1° angles instead of ±0 set forth above.

In accordance with one of the main features of the invention, the individual strips of material when being laid upon mandrel 16 are at an elevated temperature sufficient to provide a soft tacky characteristic to the particular thermoplastics strip, and are stretched under tension when being wrapped about the mandrel so that upon cooling the thermal contraction of the stressed, heated strips, will place the formed composite band 10 in a prestressed state as represented by the arrows in FIG. 2A. The resin is chosen so that the coefficient of thermal expansion is greater than that of the reinforcing material i.e. graphite. Again, the angles by which the inner and outermost layers are laid up, as well as the angles of the intermediate layers, as set forth above, can vary in order to achieve various characteristics in the final prestressed band. By appropriately prestressing the band fibers or material strips, especially in the outer layers of the band into tension, it reduces the resulting maximum stresses imparted on the band as discussed further below and shown and FIGS. 7–19.

Finite element analysis has shown that stresses induced in the band element of a deflected banded tire are relatively independent of inflation pressure. Therefore, it is appropriate that further consideration of the banded tire will be for the deflected uninflated state, as shown in FIG. 7. Characteristic of the banded tire upon deflection, the band element flattens out in the central footprint area 41 and carries compressive load around the tire circumference. Thus for the upper 300° of the tire, the radial body cords for the unpressurized tire are in tension. At approximately 45° away from the footprint, the body cords are in maximum tension and the band experiences a minimum radius of curvature, greatest displacement from the rotational center of the tire, and an associated high bending stress. Dependent upon the band stiffness, the maximum band stress can occur at approximately 45° away from the central footprint or in the footprint.

An objective band design with an acceptable shape for both pressurized and run flat (unpressurized) operation is to minimize the rotational cyclic stress and yet accept the lower frequency of road surface anomalies causing reverse band bending in the footprint and the associated high stresses. The band element geometry changes from circular to being flat against the road surface. This condition is shown in FIG. 8. The global maximum bending stress developed in the band element occurs at section A—A, while a local maximum bending stress in the band element occurs at section B—B (see FIGS. 9 and 9A).

FIGS. 9 and 9A show the relative state of stress in the band element for an uninflated deflected banded tire at the two most important locations. Of particular interest is section A—A, wherein the band element outer fibers are in compression while the band element inner fibers are in tension. At section B—B, the band element outer fibers are in tension while the band element inner fibers are in compression.

Figure 10:
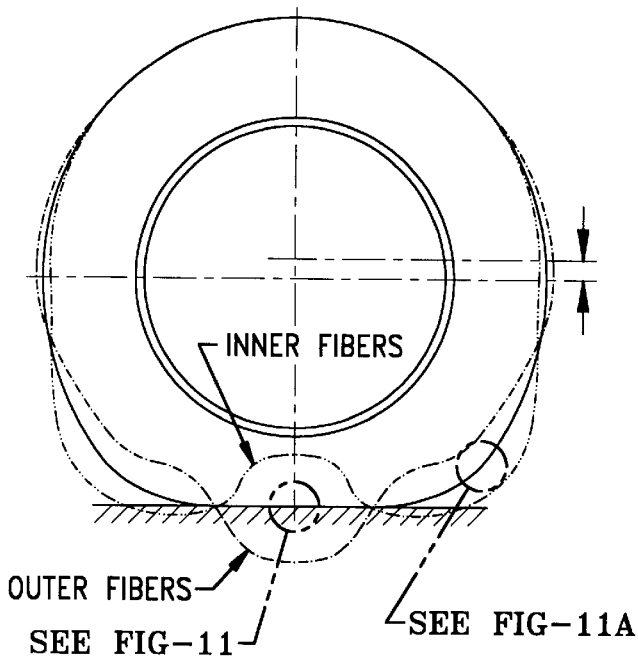
FIG. 10 is a diagrammatic view showing typical states of stress in the band on the inside and, outside surfaces for the entire tire circumference.

FIG. 10 shows typical states of stress in band element fibers on the inside and outside surfaces for the entire tire circumference. Because of symmetry, the state of stress reverses twice between tension and compression for each tire revolution. Endurance and fatigue life of the band element are crucial for tire applications, and these properties can be enhanced by minimizing the magnitude of these reversing stresses.

In order to decrease the maximum stress in the bending element, it is advantageous to lower the compressive stress in the outer fibers of the bending element by appropriately prestressing those fibers in tension. This manufactured prestressed tension in the outer fibers of the band element as discussed above, subtracts from the maximum compressive stress occurring in the deflected tire at section A—A (FIGS. 8 and 9), and results in the modified state of stress as shown in FIGS. 11 and 11A at section A'—A'.

Figure 11:
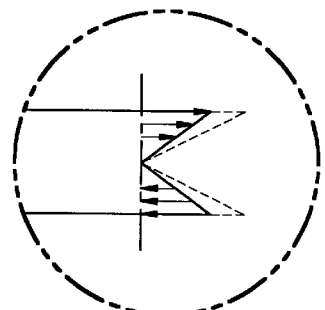
FIGS. 11 and 11A correspond to FIGS. 9 and 9A depicting how the stress conditions, without prestressing, are influenced to yield the resulting stress conditions shown therein.
Figure 11A:
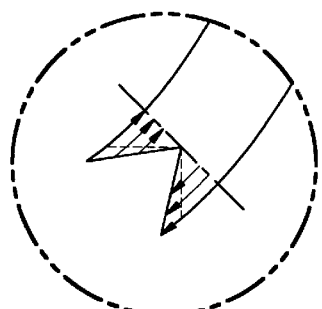

Here it can be seen how the stress conditions at sections A—A and B—B (FIGS. 9 and 9A) without prestressing are influenced in order to yield the resulting stress conditions shown in sections A'—A' and B'—B' of FIGS. 11 and 11A. The stress condition without prestressing is shown in dotted lines. The optimal condition would be the proper amount of prestressing so that the maximum stresses occurring at sections A'—A' and B'—B' are equal. This optimal condition is at least dependent on band element dimensions and material properties.

Figure 12:
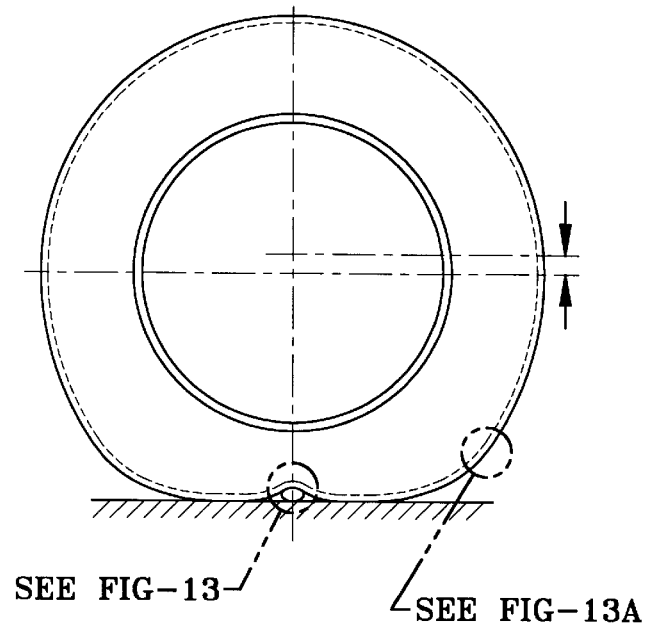
FIG. 12 is a diagrammatic view showing the tire upon encountering a surface obstacle.
Figure 13:
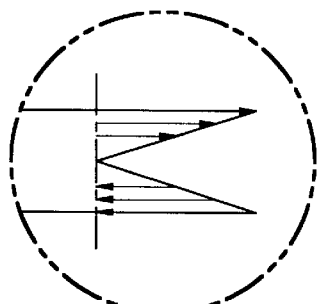
FIGS. 13 and 13A are diagrammatic sectional views taken at the same locations as FIGS. 9–9A and 11–11A, depicting the two areas of maximum bending stress in the band for the tire of FIG. 12 upon it encountering a road surface obstacle.
Figure 13A:
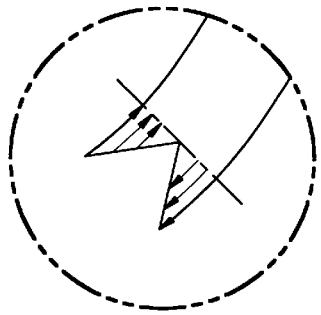

The deflection and state of stress shown in FIG. 10 is altered somewhat when the tire encounters a road surface anomaly. This condition is shown in FIG. 12. Away from the footprint, the stress states are not changed substantially. However, at the center of the footprint, the radius of curvature for the band element can be quite small due to road surface obstacles. Consequently, the bending stresses in the band element are also commensurately high for this condition. The two areas of maximum bending stress corresponding to FIG. 12 are shown in FIGS. 13 and 13A.

FIG. 12 illustrates how the band element bending stress at the central footprint increases dramatically, while the local maximum band element bending stress increases marginally. This condition can benefit more from prestressing the band element outer fibers because of the relative difference between the maximum compression and tension stresses occurring at sections 13—13 and 13A—13A, as shown in FIG. 13 and 1 3A. Prestressing the outer band element fibers in tension has the effect of decreasing the maximum compression stress at section 13—13 and increasing the maximum tension stress at section 13A—13A.

Figure 14:
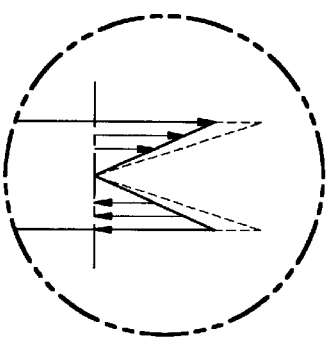
FIGS. 14 and 14A are diagrammatic sectional views similar to FIGS. 9–9A, 11–11A and 13–13A depicting a hypothetical case wherein the maximum compression stress and maximum tension stress are brought into equal amplitudes in the optimum prestressed condition in the band.
Figure 14A:
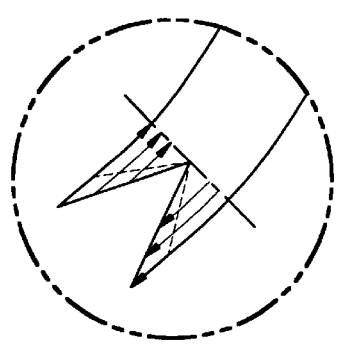

As before, the optimum prestressed condition in the band element would bring the maximum compression stress and maximum tension stress into equal amplitudes. This condition is dependent upon band element dimensions and material properties. A hypothetical case with these conditions is depicted in FIGS. 14 and 14A. The interest in equilibrating these stresses has obvious benefit for material fatigue life and endurance limits.

Figure 15:
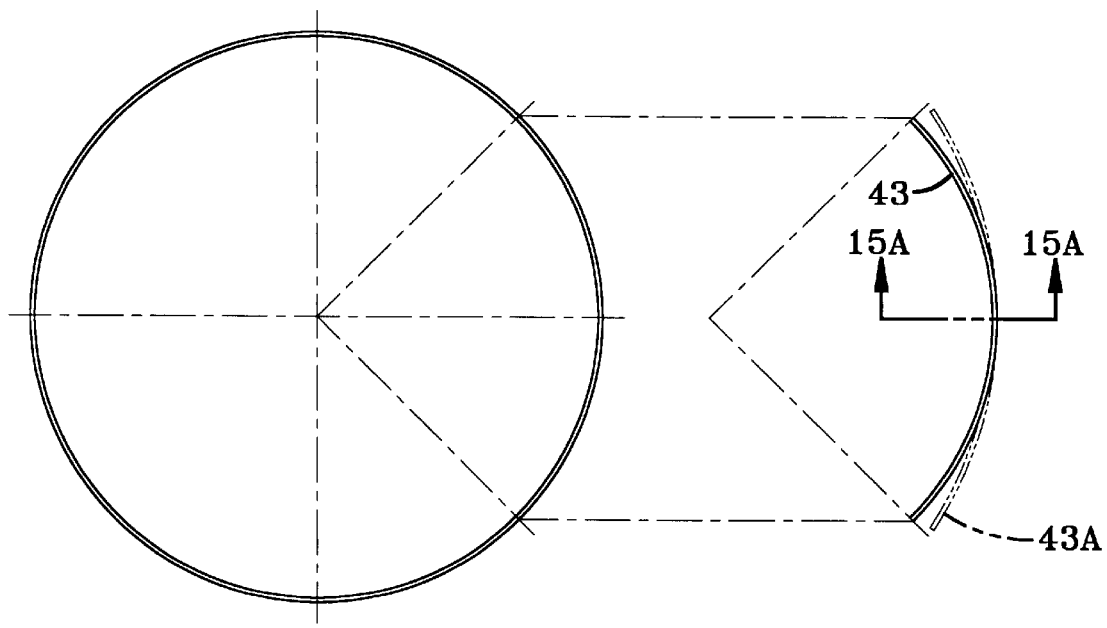
FIG. 15 is a side view of the annular reinforcement band of the present invention when the outer fibers or strips are prestressed in tension, showing the effect on an arcuate section removed from the band.
Figure 15A:
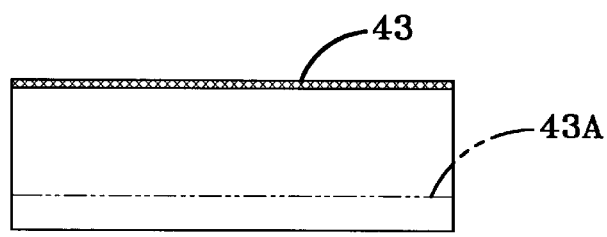
FIG. 15A is a sectional view taken on line 15A—15A, FIG. 15.

A simple manifestation of these principles will now be described. Given a band element with the outer fibers prestressed in tension as described above, upon removing a small arc from the full circle embodiment, only three results are possible. These three possibilities are the following: 1) the removed arc deforms such that it's outside diameter is smaller vs. its full circle counterpart, 2) the removed arc maintains the same outside diameter vs. its full circle counterpart, and 3) the removed arc deforms such that its diameter is larger vs. its full circle counterpart. This last condition describes the preferred embodiment, and is depicted in FIG. 15. Here a band element having the outer fibers prestressed in tension has been cut so that a small arc 43 has been removed from the band. It will be noted that arc 43 seems to spring outward to new arc 43A due to the prestressed outer fibers, and assume a larger outer diameter vs. that of the full circle band element. The dotted lines of arc 43A show the position of the band element geometry after having been removed from the full circle band element.

Figure 16:
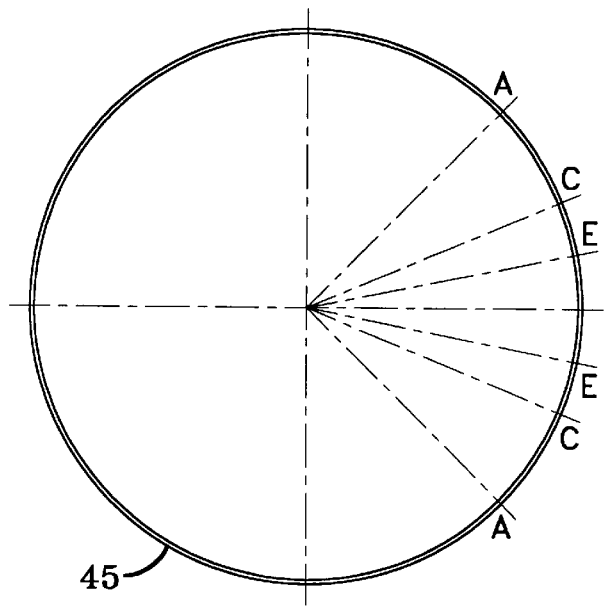
FIGS. 16, 16A, 16B, 16C, 16D, 16E and 16F are diagrammatic plane and sectional views showing the effect of prestressing the outer fibers or band forming strips, as in the present invention, in both the circumferential and axial directions, with arcuate sections of the full circle band element of FIG. 16 being shown in FIGS. 16A–16C, with sectional views thereof being shown in FIGS. 16D–16F.
Figure 16A:
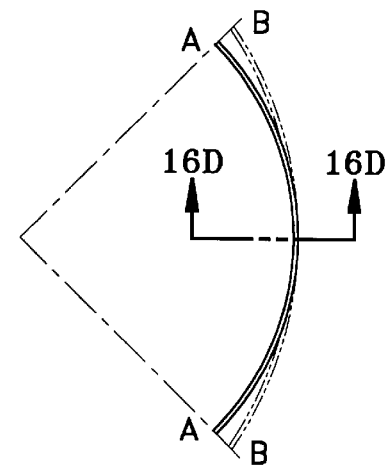
Figure 16B:
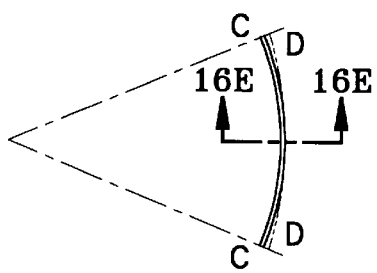
Figure 16C:
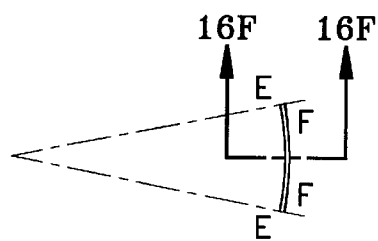
Figure 16D:
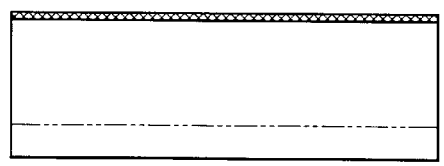
Figure 16E:
Figure 16F:

A further manifestation of the same effect is shown in FIGS. 16–16F. Here, a band element 45 (FIG. 16) made of composite layers having a bias angle between the fibers of each of the layers is shown. The net effect of prestressing the outer fibers of such a composite is to tension the outer fibers in both the circumferential and axial direction. Upon cutting a small arc from the full circle band element of such a composite, the following phenomena will be observed:

For a large chord length A—A (FIG. 16A), the new deflected outer diameter increases as in arc B—B, shown in dot dash lines. Also, there is very little deflection from side-to-side as shown in the section of FIG. 16D.

For a medium chord length C—C, the new deflected outer diameter increases as in arc D—D, shown in dot dash lines. However, now side-to-side deflection can be observed as in the section of FIG. 16E.

For a small chord length E—E (FIG. 16C), the new deflected outer diameter increases very little as in arc F—F (FIG. 16C). The side-to-side deflection now is easily observed in the section FIG. 16F.

Similar effects can be observed for various combinations of bias angles when the band element is constructed of multiple layers. Other configurations can be imagined, such as prestressing the outer fibers only near the edges of the band element. Because of the prestressing in the outer fibers, simply cutting small sections from the band element will expose this preferred condition.

Figure 17:
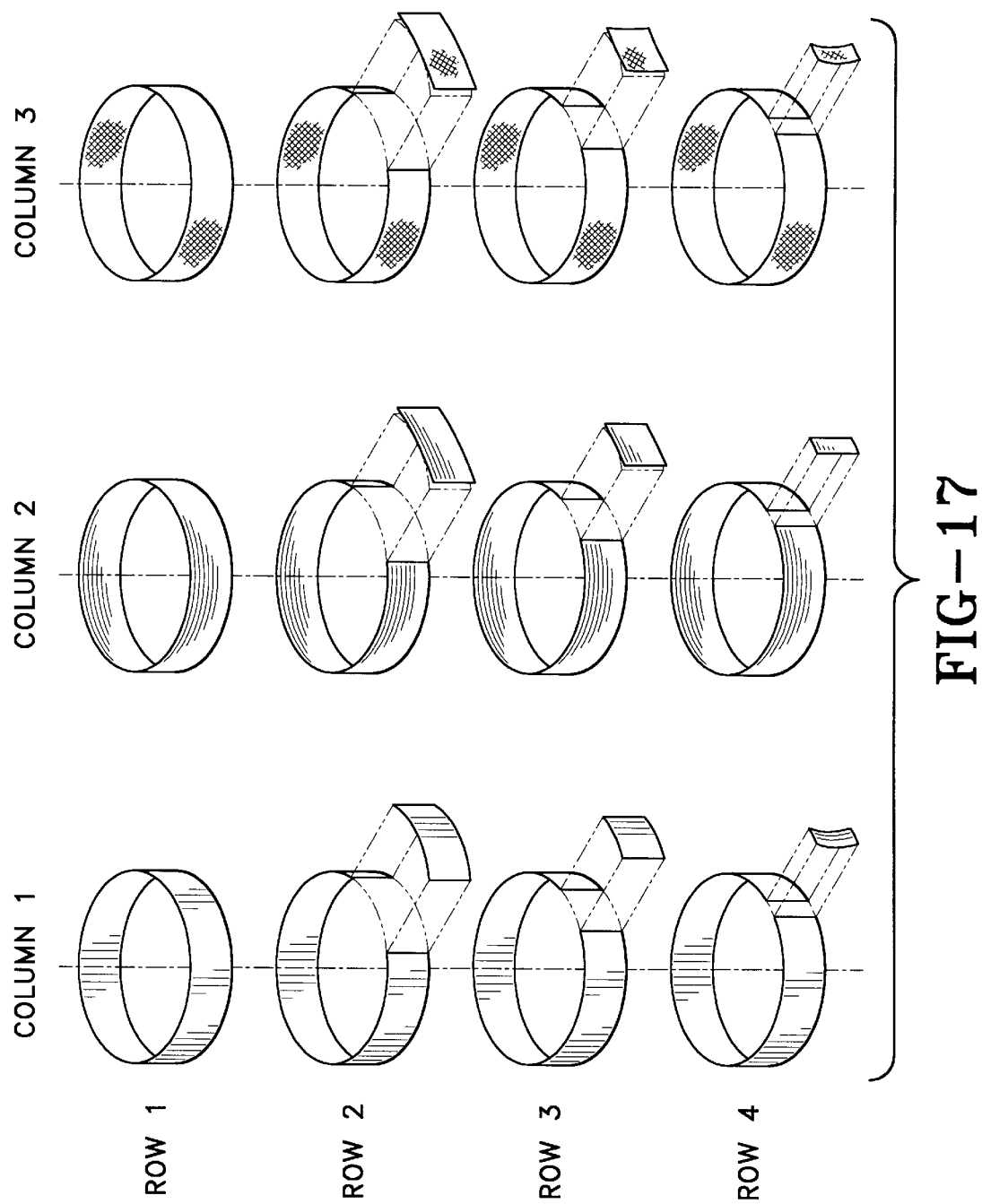
FIG. 17 is a diagrammatic series of views showing the effect that the fiber orientation and pre-stressing has on the band.
Figure 18:
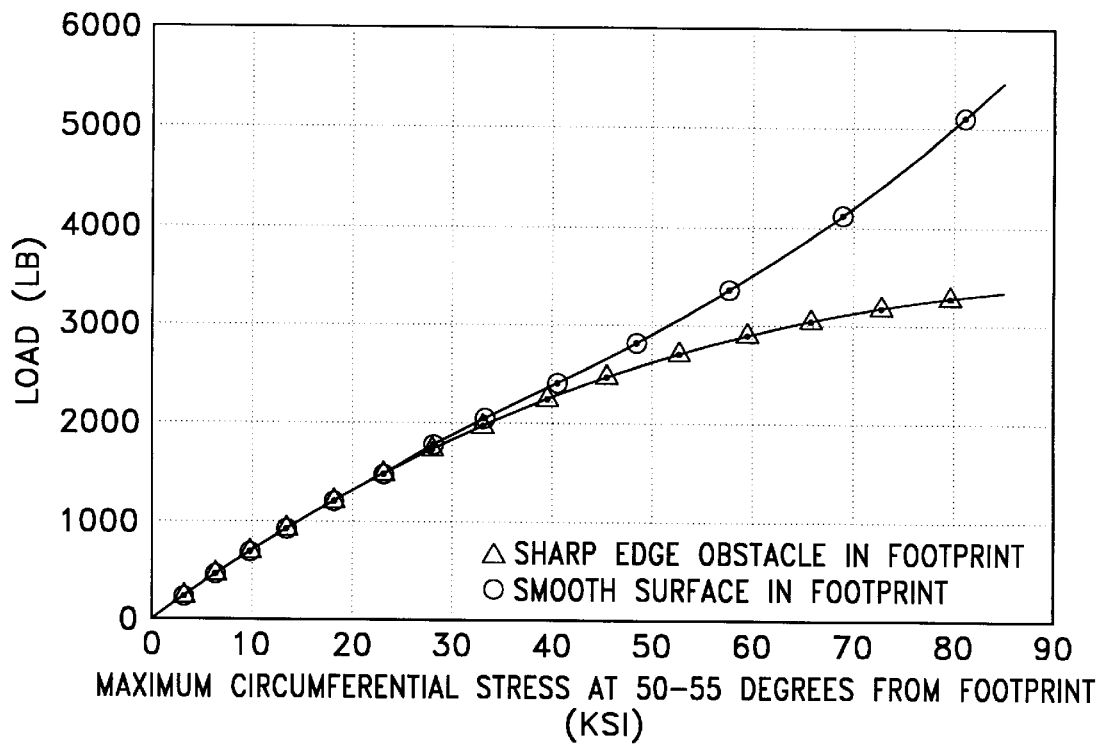
FIG. 18 is a chart showing the circumferential stress of a light truck application a 50°–55° from the footprint.
Figure 19:
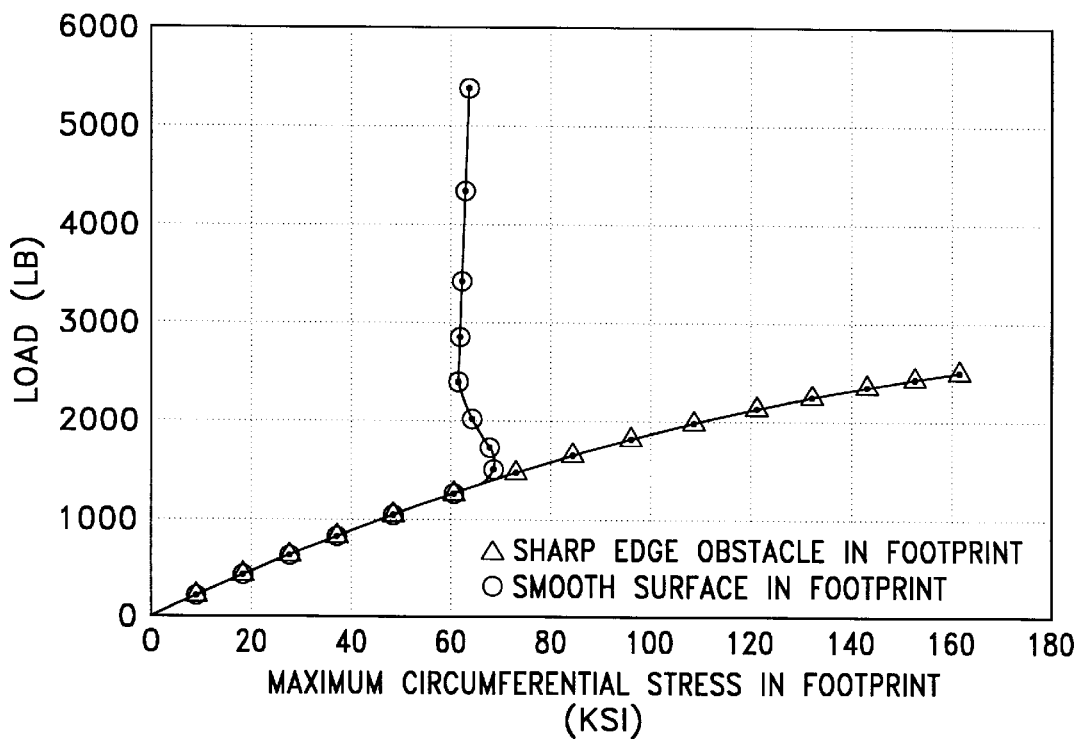
FIG. 19 is a chart plotting the circumferential stress of a light truck application in the footprint of the tire for a flat road surface and when encountering a road obstacle.

The features and teachings of FIGS. 7–16F are best illustrated and summarized in FIG. 17 which show actual test results performed on prestressed bands.

Column 1 shows the band fibers oriented only in the axial direction. Rows 2 and 3 thereof show that no bowing occurs in the circumferential direction since the band is very stiff in the axial direction due to the fiber direction. Row 4 shows that the prestressing of the fibers will cause inward bowing in a small segment.

Column 2 shows the band fibers oriented only in the circumferential direction. Rows 2 and 3 show that bowing occurs in the circumferential direction only when a large segment is cut from the band without any inward or radial bowing. Row 4 shows that there is little effect or bowing when a small segment is cut from the band since there is no arc length over which the prestressing forces can act.

Column 3 shows the preferred band of the present invention wherein the prestressed fibers are oriented in a crisscross direction, or both axial and circumferential. Row 2 shows that a large section has some distortion or flexing in both direction. Row 3 shows that a smaller section has less bowing or flexing in the circumferential direction but more bowing in the axial direction because of the smaller arc length. Row 4 shows that almost no bowing occurs in the circumferential direction but has increased bowing in the axial direction.

FIG. 17 shows the effect of prestressing of the band depending upon the orientation of the band fibers. If a prior art band without prestressing were cut into similar arcuate segments then would be no bowing or flexing in any direction because of the lack of prestressing in the fibers.

Concerning applicable methods for prestressing the annular band, a few of these are described below but the invention need not be restricted to only such methods:

Band elements made of metallic materials such as aluminum or steel can be prestressed by using heat treated flat stock and elastically rolling it into a circular shape, and subsequently fastening the ends with appropriate adhesives or by welding. This method is also applicable to high strength non-metallic composites.

Another prestressing technique applicable to band elements of metallic materials is to shot pean the inside diameter of the band element, which sets up compressive stresses on the inside surface and tension stresses on the outside surface. The resulting stress environment is beneficial and desired.

For bands made by the strips winding process described above, increasing the tension in the outer diameter layers also has shown desirable results in decreasing footprint band stresses.

Filament winding or tape winding the outer layers of a band with a fiber having higher shrinkage relative to the layers previously laid down, would effectively prestress the outer fibers in tension.

Filament winding or tape winding band elements with an inert hot gas technique involves applying heat to only the single thickness being applied and the nearby top surface of the band element to attain the desired bonding. However, the sequential cooling of the outer layers will create increasing tension on the band outside diameter and compressive stress on the inside diameter. These unequal fabrication stresses provide the desirable prestress condition described herein.

Accordingly, the improved run flat tire is simplified, provides an effective, safe, inexpensive, and efficient tire which achieves all the enumerated objectives, provides for eliminating difficulties encountered with prior tires, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved run flat banded pneumatic tire is constructed and used, the characteristics of the construction, and the advantageous, new and useful results obtained; the new and useful structures, devices, elements, arrangements, parts and combinations, are set forth in the appended claims.

We claim:

1. In a run flat pneumatic tire including an elastomeric casing with a tread formed in a crown portion thereof and sidewalls extending from the crown portion to generally circular beads adapted to normally seat themselves in airtight secured relationship with a wheel, a combined structure for resisting compressive forces on the tire when deflated, the structure comprising:

a continuous thin annular composite band fixed in said tire radially inwardly of said tread, said band having a width substantially spanning the width of the crown portion and including a plurality of helically wound adjacently positioned flat strips of material forming a plurality of wound layers of material strips with at least a portion of said strips located in outermost layers of said composite band being prestressed in tension to decrease the maximum stress at a footprint area of the tire; and means to radially stabilize said annular band comprising a multiplicity of closely spaced substantially radial reinforcing elements having freedom in shear with respect to one another in said sidewalls operatively connected to said beads and extending therefrom to at least the crown portion of the tire and being operatively connected to said annular band.

2. The run flat pneumatic tire defined in claim 1 wherein the strips are formed of a graphite fiber reinforced thermoplastic material.

3. The run flat pneumatic tire defined in claim 1 wherein the strips are formed of a material selected from the group consisting of steel, aluminum, fiberglass, and aromatic polyamide.

4. The run flat pneumatic tire defined in claim 1 wherein certain of the strips are in overlying crisscross relationship with respect to adjacent strips.

5. The run flat pneumatic tire defined in claim 1 wherein the strips in intermediate layers are arranged in a substantially alternating ±15° relationship with respect to a radial line extending perpendicular to a central axis of said band.

6. The run flat pneumatic tire defined in claim 1 wherein an innermost one of said strips is wound at an approximate 1° angle with respect to a radial line extending perpendicular to a central axis of the band.

7. The run flat pneumatic tire defined in claim 1 wherein the strips are formed of a thermoplastic resin impregnated reinforcing material, with said resin having a coefficient of thermal expansion greater than that of said reinforcing material.

8. The run flat pneumatic tire defined in claim 1 wherein the band has a width substantially equal to the width of the tread.

9. The run flat pneumatic tire defined in claim 1 wherein the band has a stiffness of approximately 2000 lbs-in$^2$.

10. The run flat pneumatic tire defined in claim 1 wherein each strip has a width of between 0.75 inches and 1.25 inches and a thickness of between 0.005 inches and 0.010 inches.

11. The run flat pneumatic tire defined in claim 10 wherein each strip has a width of one inch and a thickness of 0.007 inches.

12. The run flat pneumatic tire defined in claim 1 wherein the number of wound layers of materials strips is between 15 and 20 layers of said strips.

13. The run flat pneumatic tire defined in claim 12 wherein the number of wound layers of material strips is 18 layers of said strips.

14. The run flat pneumatic tire defined in claim 1 wherein the band has a width of between 6 and 12 inches.

15. The run flat pneumatic tire defined in claim 14 wherein the band has a width of approximately 6.7 inches.

16. The run flat pneumatic tire defined in claim 1 wherein the band has a thickness substantially in the range of 0.1 and 0.2 inches.

17. The run flat pneumatic tire defined in claim 16 wherein the band has a thickness of approximately 0.120 inches.

18. The run flat pneumatic tire defined in claim 1 wherein individual convolutions of the strips in certain intermediate layers are arranged in a spaced relationship, the spacing being substantially equal to but not less than the width of said strips.

19. The run flat pneumatic tire defined in claim 18 wherein the strips in said intermediate layers are arranged in an alternating crisscross pattern.

20. In a method for building a run flat pneumatic tire, the tire including:
 an elastomeric casing with a tread formed in a crown portion thereof and sidewalls extending from the crown portion to generally circular beads adapted to normally seat themselves in airtight secured relationship with a wheel, a combined structure for resisting compressive forces on the tire when deflated, the structure comprising:
  a continuous thin annular composite band fixed in said tire radially inwardly of said tread, said band having a width substantially spanning the width of the crown portion and including a plurality of helically wound adjacently positioned flat strips of material forming a plurality of wound layers of material strips with at least a portion of said strips located in outermost layers of said composite band being prestressed in tension to decrease the maximum stress at a footprint area of the tire; and
  means to radially stabilize said annular band comprising a multiplicity of closely spaced substantially radial reinforcing elements having freedom in shear with respect to one another in said sidewalls operatively connected to said beads and extending therefrom to at least the crown portion of the tire and being operatively connected to said annular band;
 the method including the steps of:
  forming a thin annular composite band having a width substantially spanning the width of the crown portion by wrapping a plurality of strips of material in overlapping alternating helical configurations around a mandrel to form the band with a plurality of strip layers;
  maintaining the strips at an elevated temperature sufficient to provide a tacky consistency to said strips as said strips are being wrapped around the mandrel;
  applying sufficient tension to the strips as they are being wrapped around the mandrel to substantially eliminate voids between the overlapping strip layers;
  cooling the strip layers after being applied under pressure around the mandrel whereby thermal shrinkage of said strips prestresses the formed band in tension;
  embedding the prestressed band inside the crown portion of the tire; and
  curing the resulting tire wherein the prestressed band in cooperation with the radial stabilizing elements in the sidewalls resist compressive forces encountered upon deflation of the tire.

21. The method defined in claim 20 including wrapping inner and outer strip layers at an angle of approximately ±1° with respect to a radial line perpendicular to a central axis of the mandrel, and wrapping a plurality of intermediate strip layers in substantially alternating ±15° relationship therewith.

22. The method defined in claim 20 including impregnating strips of reinforcing material with a thermoplastic resin having a coefficient of thermal expansion greater than that of said reinforcing material to form the band strips before wrapping said band strips around the mandrel.

23. The method defined in claim 20 including wrapping the convolutions of individual strip layers in a side-by-side abutting relationship.

24. The method defined in claim 20 including wrapping individual convolutions of the strips in certain intermediate layers in a spaced relationship, the spacing being a distance substantially equal to but not less than the width of said strips.

25. The method defined in claim 24 including wrapping said intermediate layer strips in an alternating crisscross pattern.

* * * * *